(12) United States Patent
Rauch (10) Patent No.: US 8,414,825 B2
(45) Date of Patent: Apr. 9, 2013

(54) MOVABLE SWEAT HEARTH FOR METAL MELTING FURNACE

(75) Inventor: Edwin L. Rauch, Fulton, NY (US)

(73) Assignee: Novelis Inc., Toronto, Ontario (CA)

( * ) Notice: Subject to any disclaimer, the term of this patent is extended or adjusted under 35 U.S.C. 154(b) by 91 days.

(21) Appl. No.: 12/806,939

(22) Filed: Aug. 24, 2010

(65) Prior Publication Data

US 2011/0049772 A1 Mar. 3, 2011

Related U.S. Application Data

(60) Provisional application No. 61/275,388, filed on Aug. 28, 2009.

(51) Int. Cl.
*F27B 3/00* (2006.01)

(52) U.S. Cl.
USPC .......................... 266/200; 266/901

(58) Field of Classification Search .................. 266/900, 266/901, 200, 236
See application file for complete search history.

(56) References Cited

U.S. PATENT DOCUMENTS

| | | | |
|---|---|---|---|
| 2,757,925 A | | 8/1956 | Carr |
| 2,763,903 A | * | 9/1956 | Herres ........................ 164/514 |
| 2,818,247 A | * | 12/1957 | Francis ........................ 266/147 |
| 3,353,807 A | * | 11/1967 | Sixel et al. .................... 266/159 |
| 3,589,692 A | | 6/1971 | Lakin |
| 4,445,849 A | | 5/1984 | Boville |
| 4,578,111 A | | 3/1986 | Gillespie et al. |
| 6,245,122 B1 | | 6/2001 | Meyers |

FOREIGN PATENT DOCUMENTS

GB 962171 7/1964

* cited by examiner

*Primary Examiner* — Scott Kastler
(74) *Attorney, Agent, or Firm* — Cooper & Dunham LLP (57) ABSTRACT

Exemplary embodiments provide a movable sweat hearth for use with a metal melting furnace having a wall provided with a metal-loading entrance. The sweat hearth includes a hearth body movable relative to the furnace into and out of contact with the wall of the furnace at the entrance. The body has exterior walls enclosing a hollow interior except at a furnace-engagable side wall of the hearth body provided with an opening communicating with the interior. The interior has a floor adapted to support a charge of scrap metal, and the opening is positioned relative to the floor to allow molten metal to drain from the interior through the opening. The floor is arranged at an angle to horizontal to slope in a downward direction towards the opening when the container is moved into sealing engagement with the wall of the furnace with the opening aligned with the furnace entrance. Other exemplary embodiments relate to a combination of a movable sweat hearth as described above and a metal melting furnace having a front wall provided with a furnace entrance.

26 Claims, 6 Drawing Sheets

MOVABLE SWEAT HEARTH FOR METAL MELTING FURNACE

CROSS-REFERENCE TO RELATED APPLICATION

This application claims the priority right of prior U.S. provisional patent application Ser. No. 61/275,388 filed Aug. 28, 2009 by applicants herein. The entire contents of application Ser. No. 61/275,388 are specifically incorporated herein by this reference.

BACKGROUND OF THE INVENTION (1) Field of the Invention

This invention relates to apparatus for melting metal scrap material, particularly aluminum scrap material. More particularly, the invention relates to apparatus for pre-treating metal scrap material and for transferring the pre-treated scrap material to a melting furnace, e.g. a reverberatory furnace or direct-charged convective furnace.

(2) Description of the Related Art

Scrap materials made of aluminum or other metals (e.g. copper) can be re-melted for re-use, but they may be contaminated and may require pre-treatment to remove or reduce such contaminants before they can be added directly to a melting furnace.

For example, reverberatory furnaces are widely used to re-melt aluminum scrap material for eventual re-use by metal fabricators, although they are also used for melting pure metals. Direct-charged convective furnaces are normally used for melting metals having lower melting temperatures, such as babbit metal or lead. Scrap metal for re-melting may be in the form, for example, of sows (large castings), ingots (e.g. T-bar ingots) and other metal pieces (often referred to as "small form"). However, metal foil is so thin that it would be converted almost entirely to oxide in such furnaces and is thus re-melted by other means.

A reverberatory furnace heats the furnace contents both by direct flame and by radiation from hot refractory linings and possibly additional heating elements. At its simplest, it is a steel box lined with alumina or other refractory brick having a flue at one end and a generally vertically lifting door at the other end closing a main entrance for the furnace through which a metal charge is normally introduced. Conventional oil or gas burners are usually placed on either side of the furnace to heat the brick and to melt the metal. The resulting molten metal is then poured into a casting machine to produce ingot. A static furnace may be tapped at the bottom by simply removing a ceramic-covered plug which then allows the molten aluminum to flow into a launder and then on to a casting machine itself. A convective furnace is similar but employs hot gases to heat the metal charge. Again, there is normally a main furnace entrance closed by a raisable door.

Aluminum scrap to be melted in such furnaces may be coated with organic materials (e.g. plastic coating layers) or may be uncoated. Coated scrap has to be melted in a side-well of the furnace where it is mixed with a flux that enables contaminants (dross) to be skimmed off before the molten metal enters the main chamber of the furnace. Uncoated (clean) scrap may be added directly to the main chamber of the furnace, but it is often wet or contaminated with water (e.g. water contained within internal shrinkage cavities formed in large castings). If water-contaminated scrap is added directly to the furnace, there is a risk of explosion, so the contaminating water has to be driven off before the scrap is introduced into the furnace. This may be done by positioning the scrap close to an entrance of the furnace and opening the furnace door to allow the furnace heat to pre-heat the metal charge for a period of time. Alternatively, the heating may be carried out in a drying chamber positioned at the furnace side well, again using heat from the furnace. The drying chamber typically has two doors, one at each opposite end. The first door is opened to load the scrap and the second door is opened after the scrap has been dried and the solid metal charge is pushed into the side well from which it migrates to the main chamber of the furnace. Unfortunately, both methods cause considerable heat loss from the furnace since a door for the main furnace entrance or the entrance to the side well is kept open to the atmosphere for a significant period of time. Even when a drying chamber is used, both doors are typically held open while the metal charge is transferred to the side well and hot air and radiant heat may pass freely through the chamber to the outside.

U.S. Pat. No. 2,757,925 issued to C. E. Carr on Aug. 7, 1956 shows the use of a charging car (container) having an open top. The car has a hinged wall at the front that swings down when the metal charge is pushed into the furnace by a ram. The wall provides a bridge that extends the reach of the container thereby allowing the solid charge to pass fully through the entrance in the front wall of the furnace. However, as the charge is being introduced into the furnace, there is a clear path from the furnace interior to the external atmosphere that allows the escape of heat. There is no suggestion that the car would be used to pre-heat the metal charge to remove contaminating water, and the design would not facilitate this because the open top of the car would allow heat to escape from the charge to the atmosphere (thereby making heating inefficient) and because the hinged wall is kept upright until the charge is pushed into the furnace (thereby blocking heat from the furnace from contacting the charge within the car).

U.S. Pat. No. 4,578,111 issued to Gillespie, John R., et al., on Mar. 25, 1986 discloses a melting furnace having a sweat chamber the floor of which forms a sweat hearth on which ingots or sows are placed. Combustion gases from the main furnace are used to pre-heat the ingots or sows, and then burners in the sweat chamber operate to melt the ingots or sows. However, the sweat chamber is a permanent part of the furnace and loading of the chamber with metal charge takes place through a slidable door that can release heated gases to the exterior as loading takes place.

It would be desirable to reduce or prevent such heat loss while facilitating the loading of scrap material into the furnace.

BRIEF SUMMARY OF THE INVENTION

Exemplary embodiments provide a movable sweat hearth for use with a metal melting furnace having a wall provided with a metal-loading entrance. The sweat hearth includes a hearth body movable relative to the furnace into and out of contact with the wall of the furnace at the entrance. The body has exterior walls enclosing a hollow interior except at a furnace-engageable side wall of the hearth body provided with an opening communicating with the interior. The interior has a floor adapted to support a charge of scrap metal, and the opening is positioned relative to the floor to allow molten metal to drain from the interior through the opening. The floor is arranged at an angle to horizontal to slope in a downward direction towards the opening when the container is moved into sealing engagement with the wall of the furnace with the opening aligned with the furnace entrance. Other exemplary embodiments relate to a combination of a movable sweat hearth as described above and a metal melting furnace having a front wall provided with a furnace entrance.

In operation, the floor preferably slopes downwardly towards the furnace-engageable side wall at an acute angle to horizontal. The angle is preferably in the range of 5 to 45°, and more preferably 15 to 35°.

The movable sweat hearth is movable relative to the melting furnace with which it is used, especially relative to the furnace opening. The hearth may be completely separate from the furnace, or temporarily or permanently attached thereto, preferably pivotal attachments such as hinges or the like, thereby making the hearth able to swing into and out of sealing engagement with the furnace wall having an opening therein. The ability of the hearth to move relative to the furnace means that the hearth can be loaded with solid scrap through the single opening that connects with the furnace interior during the drying and melting operation. It also means that the furnace opening can be used for other purposes when the hearth is moved away so the functionality of the furnace is not impaired.

The movable sweat hearth itself preferably has no heating equipment of any kind (i.e. it is unheated and free of heating means such as burners or heating elements) as it makes use of heat (radiated and convected) received directly from the melting furnace. The hearth also preferably has just one opening of a size and shape approximately or exactly the same as the main opening of the furnace with which it will be used. Consequently, there are preferably no additional openings or vents to receive hot air or gases from the furnace or elsewhere, or to allow their escape. The opening of the sweat hearth preferably matches the furnace entrance in terms of size and shape. The main openings of melting furnaces are generally square or rectangular, in which case the opening of the sweat hearth is preferably square or rectangular, but in some cases the upper edge of the furnace opening may be upwardly curved or arched (higher at the center than at the side edges), in which case the upper edge of the opening of the sweat hearth is also preferably upwardly arched to correspond. In the latter case, the entire upper wall of the sweat hearth may be in the shape of a barrel arch (semi- or part-cylindrical), so that the upper edge of the opening naturally follows the curve of the upper wall.

The walls of melting furnaces provided with a main opening (or the doors closing such openings) are often vertical, but in some cases may be slope from the vertical, e.g. slope back by an angle up to about 30°. In such cases, the front wall of the sweat hearth preferably slopes by the same angle to contact the furnace wall all around the main opening, or the front wall and/or floor are arranged at angles such that, when the sweat hearth is tilted to contact the furnace wall all around the main opening in sealing engagement, the floor has an angle of slope towards the furnace to provide the desired flow of molten metal into the furnace interior.

The exemplary embodiments may include four main types of arrangement, although others are possible. In a first arrangement, the furnace-engageable wall is arranged at right angles to the bottom wall of the sweat hearth and the lining of the hearth (e.g. the refractory layer) thickens towards the side wall opposite to the furnace-engageable wall (i.e. away from the entrance). This means that the floor of the hollow interior slopes towards the opening when the furnace-engageable wall is held vertical. This arrangement is suitable when the front wall of the furnace is vertical and the sweat hearth is moved into contact with the furnace without being tilted. The scrap metal load is supported on the sloping floor. In a second arrangement, the furnace-engageable wall and the bottom wall are provided at right angles to each other, but the lining has the same thickness across the floor, so the floor does not slope when the sweat hearth is positioned with the bottom wall horizontal, e.g. as when the hearth is being loaded with scrap. This arrangement is suitable when the front wall of the furnace is tilted backwards at an angle to the vertical. When the hearth is moved into position in contact with the furnace, the hearth is tilted so that the furnace-engageable side wall comes into sealing engagement with the furnace. This tilts the floor of the hearth towards the opening to allow draining as the metal melts. A third arrangement has no thickening of the lining of the bottom wall and thus provides a horizontal floor for loading; however, the hearth has a furnace-engageable side wall that slopes rearwardly from bottom to top when the bottom wall is horizontal. This kind of arrangement can be employed when the furnace has a vertical front wall. As the sweat hearth is moved into position at the furnace, it is tilted from the rear so that the sloping side wall is brought into sealing engagement with the vertical front wall of the furnace. The angle of tilt of the sweat hearth slopes the floor towards the opening to facilitate draining of the sweat hearth. A fourth arrangement has both a thickening lining at the bottom wall and a rearwardly or forwardly sloping furnace-engageable wall. This arrangement allows the interior to have a floor that slopes by only a small angle to facilitate loading while still having a desired larger angle of tilt when the hearth is moved into sealing engagement with the furnace and tilted. When used with a furnace having a rearwardly sloping front wall, the angle of slope of the wall when the hearth is engaged with the furnace is provided by both the thickening of the lining and the angle of tilt of the hearth. If the rearward slope of the furnace wall is too great, the furnace-engageable wall of the sweat hearth may be provided with a forward slope, so that the angle of the floor is kept within a desirable range when the hearth is tilted to meet the furnace wall. All these arrangements provide a sweat hearth that can be moved away from the furnace entrance for loading purposes, but can provide a desired angle of slope to the floor of the sweat hearth during the drying and melting operation when in contact with the furnace.

In all exemplary embodiments, the slope of the floor (when the sweat hearth is in the operating position) is made such that the solid metal loaded into the sweat hearth does not slide or become unstable, but the molten metal drains out.

It should be noted that the term "sealing engagement", which is used to refer to the contact between the sweat hearth and furnace, means that the sweat hearth contacts the furnace all around the periphery of the opening with tight (but not necessarily hermetical) engagement. The engagement is sufficient to prevent undue flow of gases and/or heat to or from the furnace and the atmosphere, and to prevent leakage of molten metal. Thus, contour of the furnace-engageable wall closely matches that of the surround of the furnace entrance. Usually, the furnace wall is planar, so the furnace-engageable wall is made planar, and sealing engagement occurs when the walls are co-planar.

An advantage of the exemplary embodiments is that the metal charge is both heat-soaked to remove water and possibly other contaminants and is then fully melted so that it is fed as a molten liquid into the furnace chamber. In effect, the sweat hearth temporarily becomes a part of the furnace chamber but keeps the charge separate from the molten metal until the charge itself is molten. The sweat hearth is preferably insulated against heat loss (e.g. by the refractory lining and/or possibly by the application of external insulation) to such an extent that the charge can be heated and fully melted by heat from the furnace alone, and such that heat loss from the furnace is minimal (e.g. no greater than from the walls of the furnace itself).

BRIEF DESCRIPTION OF THE SEVERAL VIEWS OF THE DRAWINGS

Exemplary embodiments of the invention are described in detail in the following with reference to the accompanying drawings, in which.

DETAILED DESCRIPTION OF THE EXEMPLARY EMBODIMENTS

Figure 1:
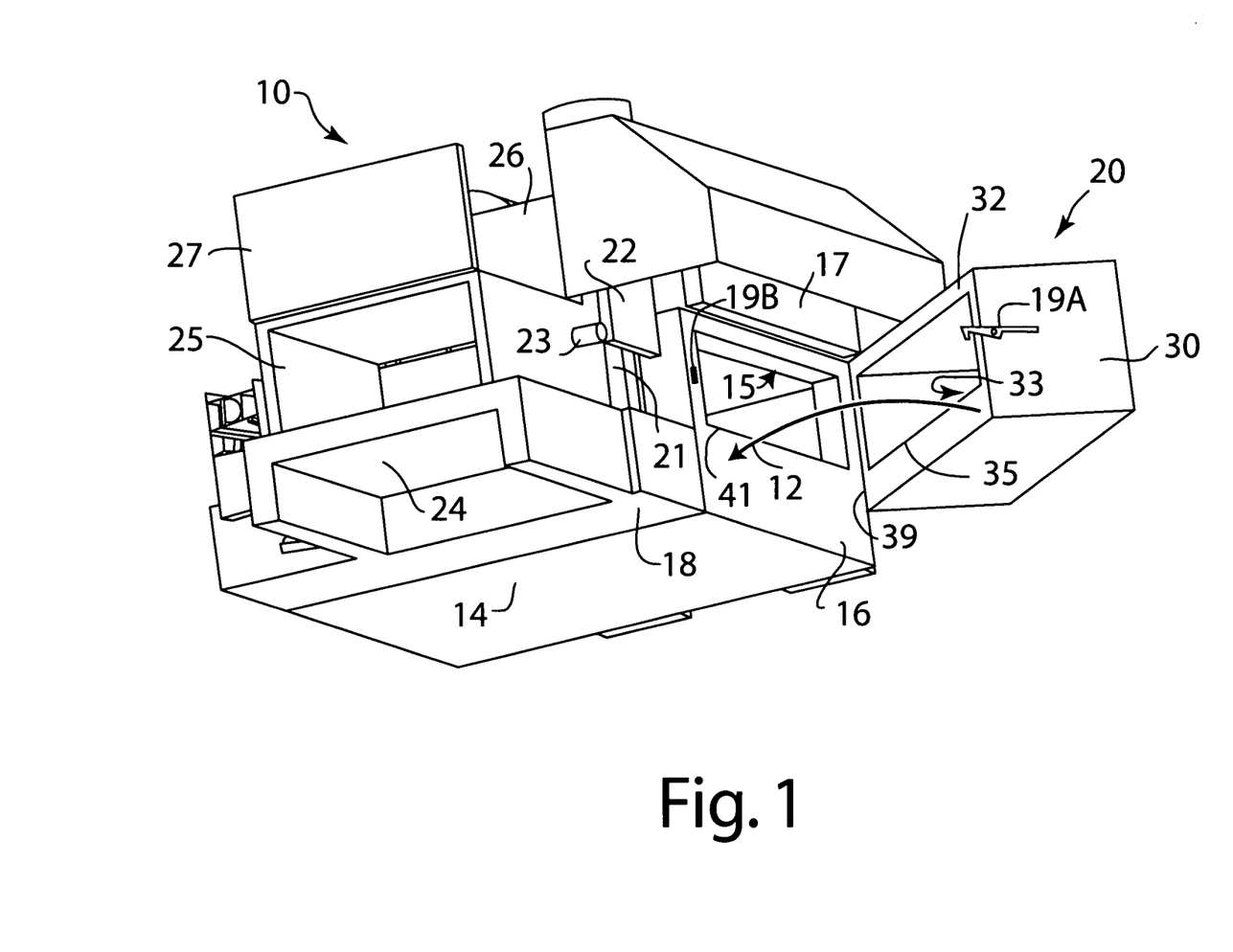
FIG. 1 is a perspective view of a reverberatory furnace having a hinged sweat hearth according to an exemplary embodiment of the present invention.
Figure 2:
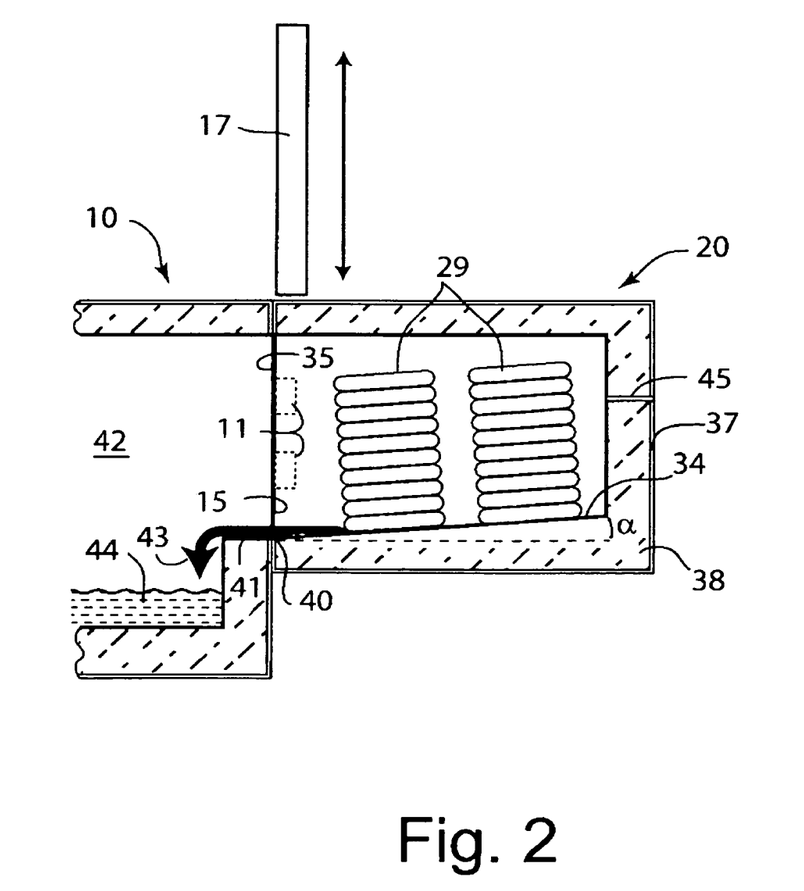
FIG. 2 is a vertical cross-section of the sweat hearth of FIG. 1 and an adjacent part of the furnace.

A first exemplary embodiment of this invention is shown in FIGS. 1 and 2 of the accompanying drawings. The apparatus illustrated in FIG. 1 is a combination of a reverberatory furnace 10 and a movable sweat hearth 20. FIG. 2 shows the sweat hearth 20 and just an adjacent part of the furnace.

The furnace 10 has a main chamber 14 provided with a main furnace entrance 15, normally used for metal-loading, in a generally planar vertical furnace front wall 16, which entrance can be used for loading scrap or new metal and can be opened or closed by a vertically movable furnace door 17 (shown in the open position in FIG. 1). The furnace door, when closed, prevents the loss of undue heat from the furnace through the metal-loading entrance 15 in the form of hot air and radiant heat. The furnace 10 has a side well 18 that communicates with the main chamber 14 via openings (not shown) below the normal surface level of molten aluminum alloy within the main chamber. The side well 18 has an opening (not visible) similar to the main entrance 15 of the furnace and a closable door (also not visible) for the opening. A further opening 21 is provided in the side well 18 to allow access for tools used dross skimming, and a door 22, that can be raised or lowered, is provided for closing the opening. A burner 23 provides heat to the side well and other burners (not shown) provide heat to the main furnace chamber 14. An apron 24 positioned in front of the opening of the side well supports a removable loading chamber 25 having front and rear doors 26 and 27 that open or close the open side walls of the loading chamber 25. A charge of scrap metal (not shown) positioned within the loading chamber 25 may be loaded into the side well by opening both the rear door 27 and the front door 26 and pushing the charge into the side wall from the rear (e.g. by means of a vehicle-mounted ram (not shown)). However, as both doors 26 and 27 are required to be open at the same time, as well as the door for the sidewell opening, heat can escape from the sidewell directly to the atmosphere through the loading chamber 25. Such an arrangement is therefore not ideal for loading scrap metal into the furnace via the sidewell, except when the metal charge is contaminated with organic materials so that dross removal will be required.

To avoid such heat loss, at least when drying and loading uncoated ("clean") scrap metal, the illustrated exemplary embodiment provides the sweat hearth 20 which is pivotally attached to the furnace 10. The sweat hearth 20 is in the form of a hollow sweat hearth body 30, preferably generally rectangular (i.e. box-shaped), that is closed on all sides except one, i.e. at a generally planar side wall 32 that is engageable with the furnace, as will be described. The container body 30 surrounds a hollow interior 33 of the sweat hearth and encloses the interior from external atmosphere on all sides except at the furnace-engageable side wall 32. The interior of the sweat hearth has a floor 34 which can support a metal charge 29 (e.g. stacks of scrap metal sows, ingots or pieces). The furnace-engageable side wall 32 of the container body 30 is provided with an opening 35 preferably having a shape (e.g. rectangular) and dimension similar or identical to that of the main furnace entrance 15. The sweat hearth 20 preferably has an external shell 37 made of steel (or other heat-resistant metal) lined with a layer 38 of an insulating refractory material that is preferably heat-insulating and resistant to abrasion and attack by molten metal while retaining good thermal shock resistance. Examples of suitable refractory materials include those that contain 40 to 95% by weight alumina, with the balance being mostly silica. Small quantities of binders and non-wetting agents may be added to improve strength, metal resistance and workability. A typical choice would be the refractory sold as Ultra Express™ 70 AL sold by Harbison-Walker Refractories (a division of ANH Refractories of Cherrington Corporate Center, 400 Fairway Drive, Moon Township, Pa. 15108, U.S.A.). The thickness of the layer 38 is preferably sufficient to provide heat insulation effective for maintaining a temperature above the melting point of the metal scrap from heat from the furnace alone.

The sweat hearth 20 is attached by hinges 11 to the furnace wall along an edge 39. Such hinges are designed to carry the considerable weight of the sweat hearth and its metal charge, and pins, bearings, etc., thereof are sized accordingly. The hinges are such that the furnace-engageable side wall 32 of the sweat hearth may be swung in the direction shown by arrow 12 to snugly dock with the front wall 16 of the furnace, as shown in FIG. 2. The furnace-engageable wall 32 then engages against the surrounds (jambs, lintel, etc.) of the furnace entrance 15 and preferably aligns a lower edge 40 of the opening 35 in the furnace-engaging wall 32 with a lower edge 41 of the furnace entrance 15, so that these lower edges are both on the same vertical level. Preferably, the opening 35 in the furnace-engageable wall 32 of the sweat hearth 20 is flush with the floor 34 in the interior 33 to allow complete draining of molten metal. A latch 19A may be provided adjacent to the furnace engageable wall on the side opposite to the hinges 11 to engage with a corresponding part 19B on the furnace wall to hold the sweat hearth firmly in engagement with the furnace wall during a drying and melting operation.

While the sweat hearth is in the open position, shown in FIG. 1, it may be loaded with pieces of scrap metal (e.g. sows or ingots), referred to as a metal charge 29, through the opening 35. During this operation, the door 17 of the main furnace chamber is kept in the closed (lowered) position to prevent heat loss through the main furnace entrance 15. When loading of the sweat hearth is complete, the door 17 is raised to the upper (open) position and the sweat hearth is quickly swung to the closed position of FIG. 2 and latched in place. The time required for these operations (door opening and movement of sweat hearth) is quite short (a matter of seconds), so the heat loss through the opening 15 is kept to a minimum. When the sweat hearth is in the closed position of FIG. 2, the interior 33 of the hearth communicates with an interior 42 of the main furnace chamber 14 through the furnace entrance 15 and sweat hearth opening 35. Heat from the furnace interior heats the metal charge 29 and drives off any contaminating water. Since the sweat hearth is closed on all sides, except at the side wall 32 that engages (i.e. docks with) the furnace, there is no significant heat loss from the furnace interior during this heating period. The enclosing walls (sidewalls, top wall and bottom wall) of the hearth block direct communication between the furnace and the exterior atmosphere.

After a period of time (normally up to about 30 minutes, depending on the furnace temperature) the contaminating water is driven off and the metal charge 29 begins to melt. In this exemplary embodiment, the floor 34 of the sweat hearth is angled downwardly as shown in FIG. 2 from rear to front at an angle α so that, as the metal melts, molten metal flows into the furnace through the main entrance 15 as indicated by arrow 43. Consequently, the charge of metal 29 does not have to be pushed into the furnace because the heat from the main furnace chamber is sufficient to raise the temperature of the entire charge above its melting point. There is also no need for a separate drying operation because the drying takes place as the metal charge is heated up to its melting temperature.

The angle of slope α is preferably not made too large because the metal charge 29 might then slide into the furnace before completion of melting, possibly resulting in the formation of a dangerous wave in the molten metal 44 inside the main furnace chamber, or possibly an explosion due to water content in the metal (if the metal charge slips into the furnace before sufficient time has passed to drive off the contaminating water). On the other hand, the angle of slope is preferably not made too shallow or the metal, as it melts, may not flow quickly or completely into the furnace chamber (the slope may be too shallow for gravity to overcome the friction between the molten metal and the material of the floor). Preferably, the angle of slope α is kept in the range of 5 to 45°, more preferably 15 to 35°. The preferred angle may be dependent, to some extent, on the coefficient of friction of the material of the floor 34, because a material having a low coefficient of friction would allow slippage of the metal charge more readily than a material having a high coefficient of friction. However, most insulating refractory materials generally have a similar relatively high coefficient of friction, so this consideration is not normally especially important. The width and height of the stack of the metal charge should also be selected to maintain a stable charge, and this depends to some extent on the coefficient of friction of the metal and the size and shape of the metal pieces. Such details may be worked out by simple trial and experimentation.

As the charge of metal pieces 29 dries within the sweat hearth, water vapor is produced and this dissipates into the atmosphere within the furnace and is vented to the exterior via a furnace exhaust system (not shown), so no special venting arrangement is normally required for water vapor removal from the sweat hearth itself. As already noted, the seal between the sweat hearth 20 and the furnace wall 16 does not have to be hermetic, so water vapor may also be expelled through any small gaps. Of course, the seal between the furnace and the sweat hearth must preferably be sufficiently tight to avoid undue heat loss and to prevent molten metal from escaping through any gaps between furnace and sweat hearth at the lower edge 40. Furthermore, the total area of any gaps should preferably be small enough to permit the maintenance of a slight positive pressure within the furnace compared to the exterior. A larger area of gaps could allow cold air to be drawn in, thereby decreasing the furnace efficiency.

A viewing port 45, preferably formed of a heat-resistant glass or other transparent material, or provided with a metal cover (not shown) that can be moved temporarily to one side, may be provided if desired so that the progress of the drying and melting operations may be monitored from the outside.

Figure 3:
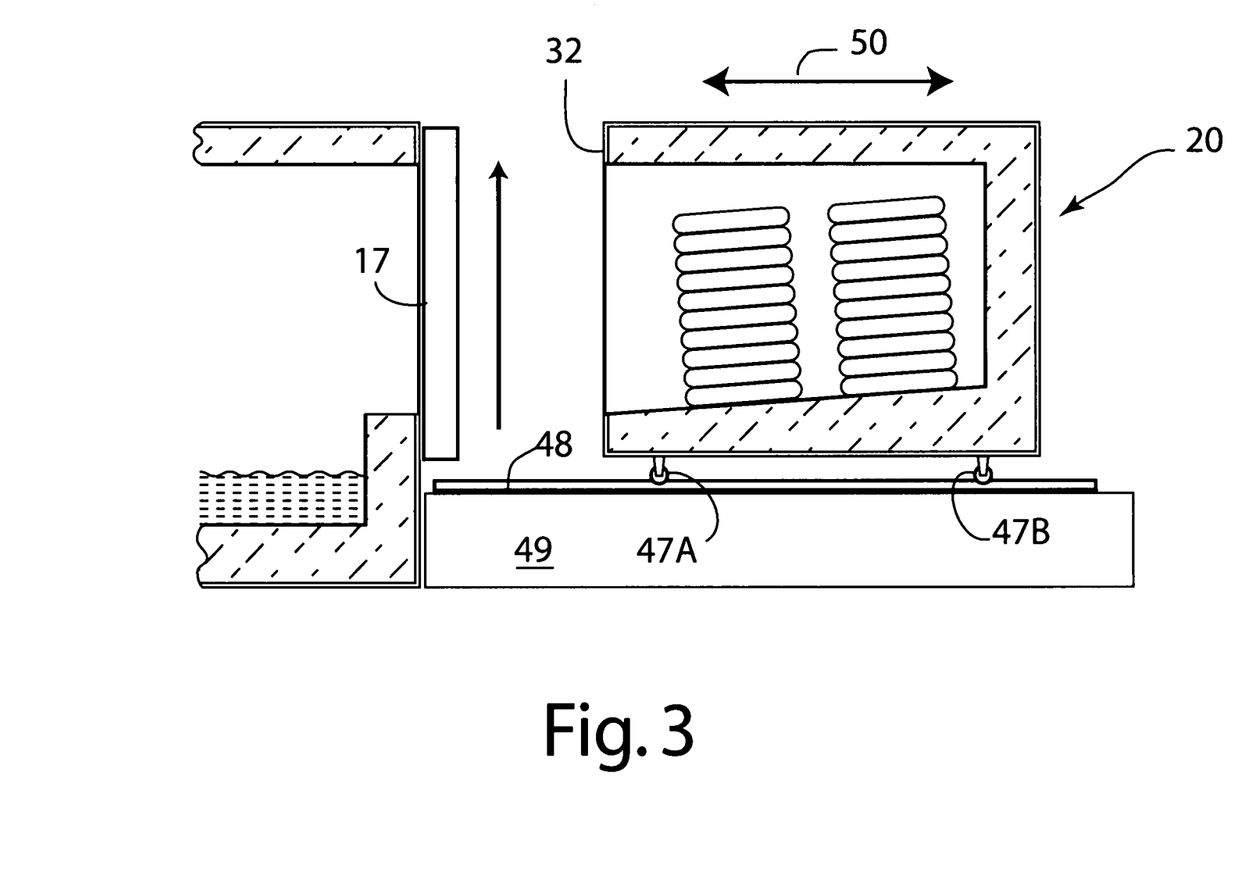
FIG. 3 is a cross-sectional view similar to that of FIG. 2 showing another exemplary embodiment of the invention.

Instead of attaching the sweat hearth 20 to the furnace 10 by means of hinges 11 as shown in FIG. 2, the sweat hearth may be kept completely separate from the furnace and may simply be moved in and out of docking contact (sealing engagement) with the furnace, as shown in FIG. 3. For example, the sweat hearth 20 may be provided with flanged wheels 47A and 47B that run on rails 48 mounted on a support 49 at the appropriate height. The rails may be straight so that the sweat hearth may simply be moved back and forth towards or away from the furnace (as shown by arrow 50), or the rails may be curved, e.g. in a quarter circle, so that the sweat hearth turns as it moves away from the furnace to provide easier access to the furnace-engageable side wall 32 for loading. The sweat hearth may be moved simply by being pushed by an operator, or it may be pushed or dragged by a vehicle or by an onboard motor (not shown). The sweat hearth is preferably provided with a latching mechanism (e.g. latches similar to the latch 19A of the embodiment of FIGS. 1 and 2), so that the hearth is firmly held in position against the furnace when moved into engagement with the furnace.

Figure 4A:
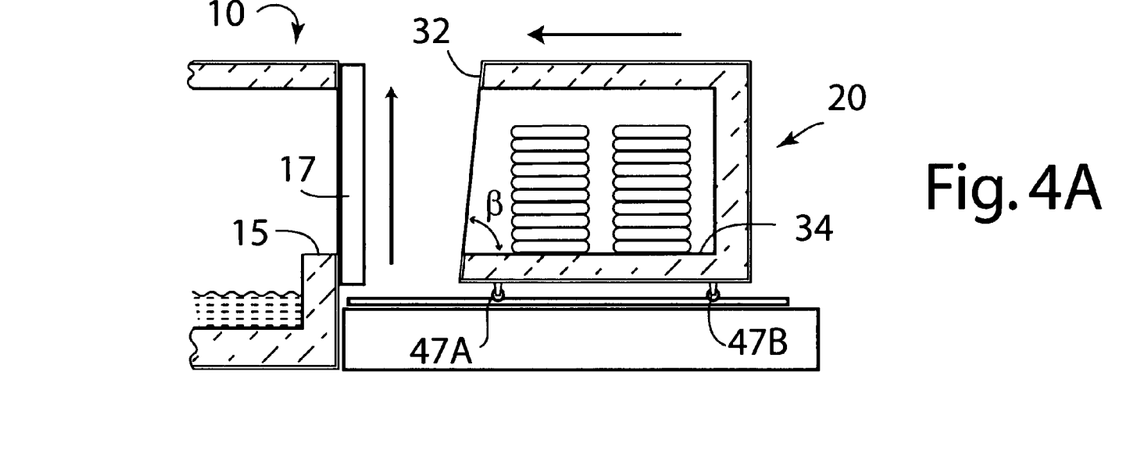
FIG. 4A and FIG. 4B are similar cross-sectional views showing yet another exemplary embodiment of the invention with the sweat hearth shown in the loading position (FIG. 4A) and the operational position connected to the furnace (FIG. 4B)
Figure 4B:
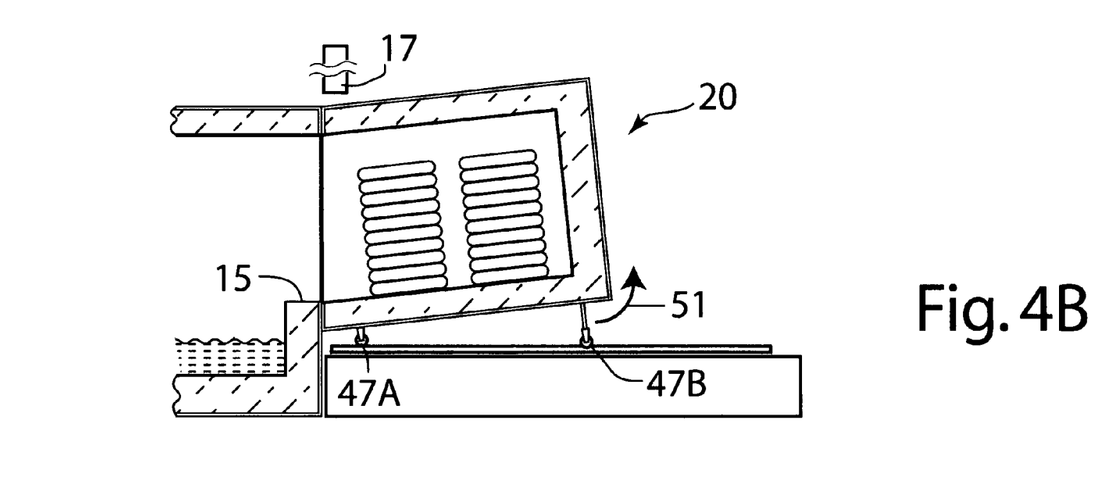

FIGS. 4A and 4B show an alternative exemplary embodiment in which the floor 34 of the sweat hearth 20 is horizontal when the hearth is separated from the furnace as shown in FIG. 4A. This may make the hearth easier to load. However, the furnace-engageable side wall 32 of the hearth is made to slope rearwardly from the bottom to the top by an included acute angle β so that, when the hearth is moved into contact with the vertical front wall of the furnace 10, it can be tilted as shown by arrow 51 to provide proper contact between the hearth and the furnace all around the furnace opening 15 to form an effective seal against loss of heat, gases and molten metal. This creates an upward slope to the floor 34 from the front of the hearth to the rear that is equivalent to angle α of the embodiment of FIG. 2 (α=90°−β) so that molten metal drains into the furnace as in the other embodiments described above. Therefore, if the angle α is in the range of 5° to 45° (more preferably 15° to 35°), the included angle β is in the range of 45° to 85° (more preferably 55° to 75°). The required tilting may be achieved by any suitable means, e.g. by making the supports for the rear wheels 47B telescopic as shown and driven by hydraulics or pneumatics, or by providing the hearth with a mechanical or hydraulic jack or screw (not shown) at the rear of the hearth. Alternatively, lifting equipment such as a front end loader may be used to tilt the hearth 20 and to keep it in the tilted orientation until all of the metal has dried, melted and drained into the furnace. Preferably, the hearth is again provided with latching means to hold the hearth firmly in place against the furnace in the up-tilted position, or there may be a more elaborate guiding and locking arrangement, e.g. hooks below the sill line of the furnace for the hearth to be tipped into. Such an arrangement may be mounted beneath and made part of the hearth or mounted above and made part of the furnace or hearth.

Figure 5A:
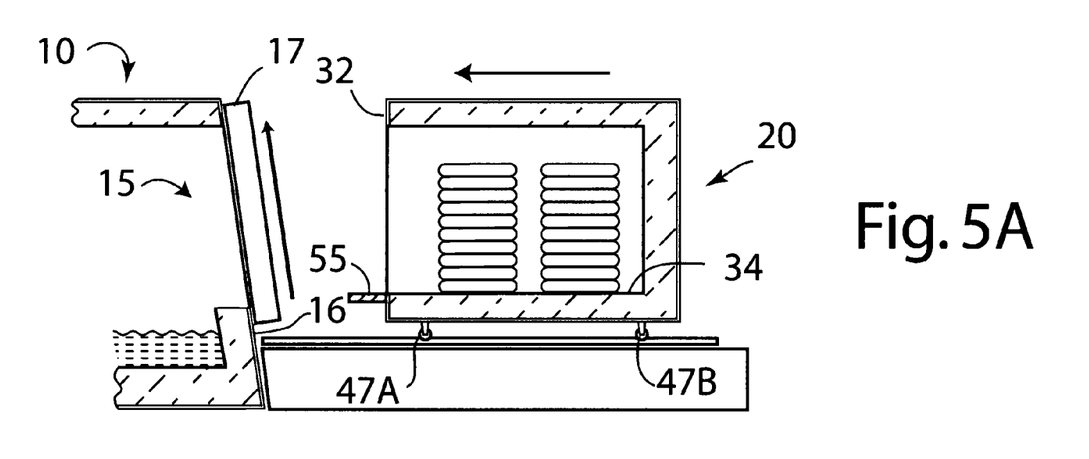
FIG. 5A and FIG. 5B are similar cross-sectional views showing yet another exemplary embodiment of the invention with the sweat hearth shown in the loading position (FIG. 4A) and the operational position connected to the furnace (FIG. 5B)
Figure 5B:
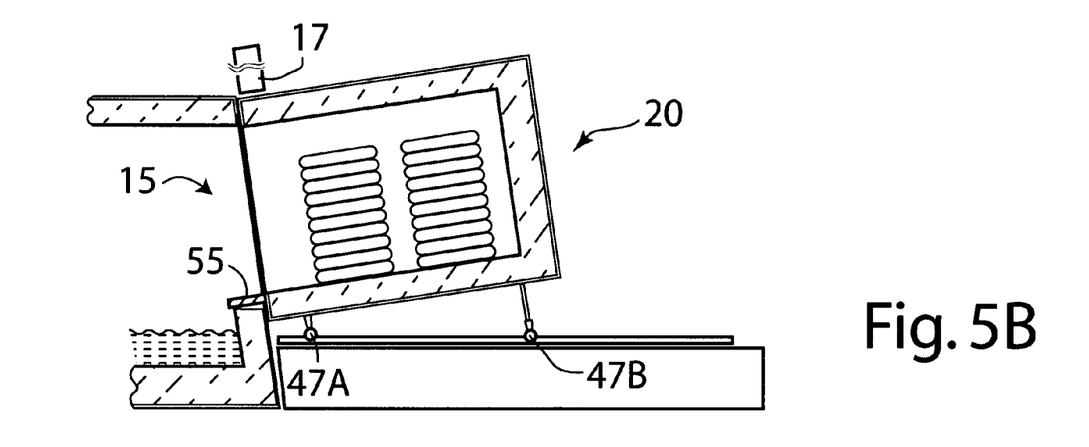

It should be noted that, in the case of some furnaces, the front wall 16 of the furnace is not vertical, but may slope backwards from bottom to top by an angle up to about 30°. Such an example is shown in FIGS. 5A and 5B. If the angle of rearward slope of the front wall 16 of the furnace is large enough, the sweat hearth may have a horizontal floor 34 when separated from the furnace (i.e. the thickness of the lining on the bottom wall of the hearth forming the floor 34 may be the same at all points on the bottom wall). In this case, the furnace-engaging wall 32 of the hearth may be vertical and the hearth may be tilted to fully engage the sloping front wall 16 of the furnace as shown in FIG. 5B. This causes the floor 34 to tilt when the hearth is engaged with the furnace, so that molten metal may drain out of the hearth into the furnace as in the other embodiments.

In this embodiment, a horizontally-projecting sill 55 is provided on the furnace-engageable wall 32 flush with the floor 34. The sweat hearth 20 is dimensioned such that the sill 55 projects into the furnace entrance 15 when the sweat hearth is moved into contact with the furnace. The clearance of the sill from the lower edge of the furnace entrance is made such that the sill does not bind against the lower edge of the furnace entrance as the hearth is tilted (FIG. 5B) to achieve sealing engagement with the furnace. This reduces the possibility of molten metal leakage between the sweat hearth and furnace at the lower edge. All exemplary embodiments may include such a projecting sill for this purpose.

Figure 6A:
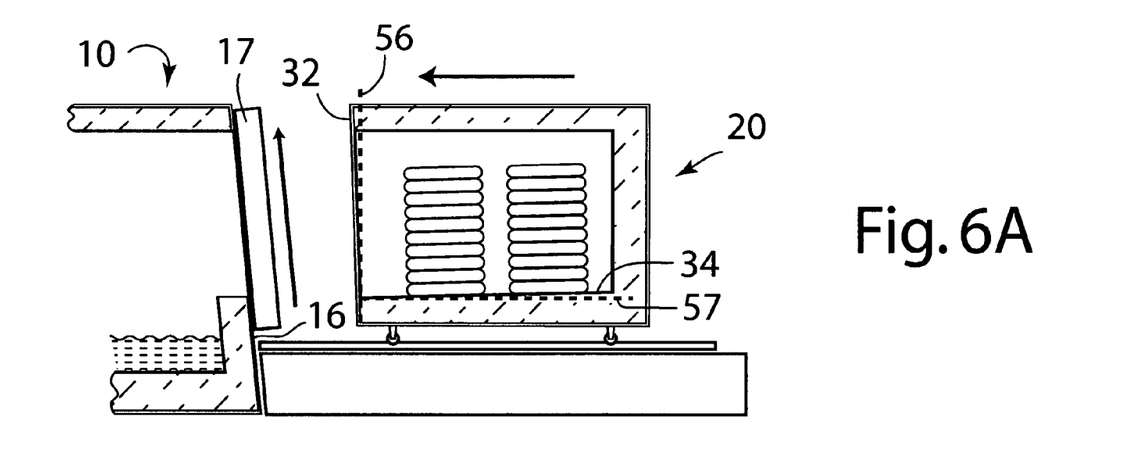
FIG. 6A and FIG. 6B are similar cross-sectional views showing yet another exemplary embodiment of the invention with the sweat hearth shown in the loading position (FIG. 4A) and the operational position connected to the furnace (FIG. 6B).
Figure 6B:
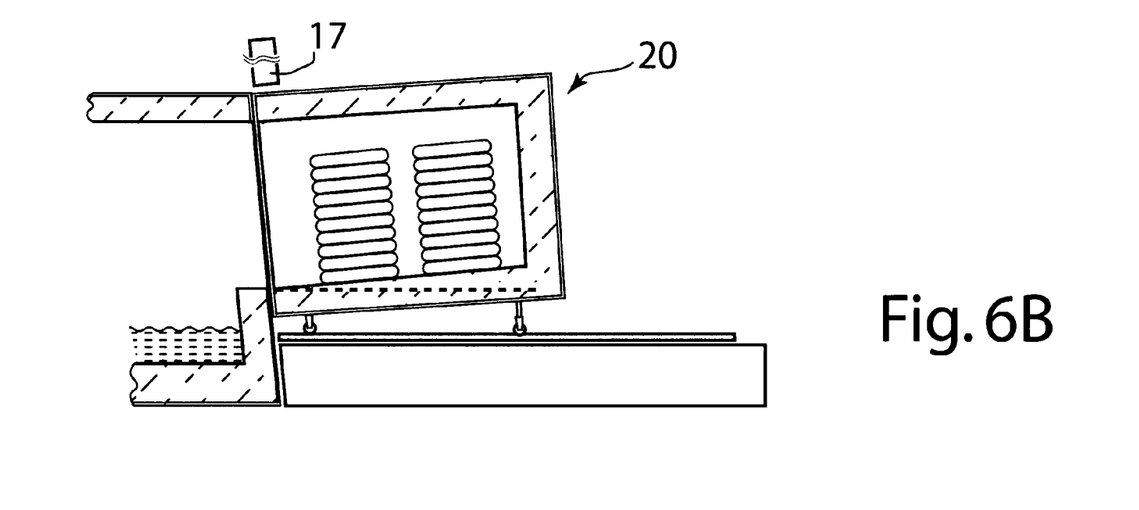

If the angle of rearward slope of the front wall 16 of the furnace is slight, the required slope of the floor 34 in the furnace-engaged position of the hearth may be ensured either by providing a slight rearward slope to the furnace-engageable wall 32 so that the hearth has to be tilted further for full engagement with the furnace wall 16. Alternatively, as shown in FIGS. 6A and 6B, if the angle of slope of the front wall 16 of the furnace is too large, the furnace-engageable wall 32 of the hearth 20 may be provided with slight forward slope (relative to the vertical as shown by broken line 56). Additionally, the lining for the bottom wall may thicken slightly towards the rear, but not as much as shown in FIG. 3, so that the floor slopes by only a slight angle (relative to the horizontal, as represented by broken line 57) as shown in FIG. 6A. This provides a slope to the floor 34 even when the hearth is spaced from the furnace for loading, but the slope is increased when the hearth itself is tilted for full engagement with the furnace as shown in FIG. 6B. Therefore, in the furnace-engaged position, the tilt of the floor is adequate for molten metal drainage and is a combination of contributions made by the slope of the floor and the tilting required to form sealing engagement. Hence, the slope of the front wall, the floor and the furnace wall can all be adjusted or accommodated to provide the floor with the required degree of slope when the hearth is in the operating position.

In all exemplary embodiments, the furnace is preferably operated in the normal manner, although the furnace burners may be reduced in output or redirected to keep flame out of the sweat hearth. While this may not be necessary in many cases, it may help to avoid rapid melting of the metal charge before full drying has taken place, particularly if the nominal temperature in the furnace exceeds 1000° C.

What I claim is:

1. A movable sweat hearth for use with a metal melting furnace having a wall provided with a metal-loading entrance, said sweat hearth comprising:

a hearth body movable relative to the furnace into and out of contact with said wall of said furnace at said entrance, the hearth body having exterior walls enclosing a hollow interior except at a furnace-engagable side wall of the body provided with a single opening communicating with said interior requiring both loading of said metal into said interior and discharging of molten metal from said interior to said furnace through said single opening, the interior having a floor adapted to support a charge of metal, and the opening being positioned relative to the floor to allow molten metal to drain from said interior through said opening; and said hearth body being configured to align said floor at an angle to horizontal to slope in a downward direction towards said opening when said container is moved into sealing engagement with said wall of the furnace with said opening aligned with said furnace entrance; and to require said hearth body to be moved away from the metal-loading entrance of the furnace for loading of said interior of the hearth body with a charge of metal through said opening of the hearth body.

2. The hearth of claim 1, wherein said angle to horizontal is in a range of 5 to 45°.

3. The hearth of claim 1, wherein said angle to horizontal is in a range of 15 to 35°.

4. The hearth of claim 1, wherein said side wall is oriented at 90° to said floor and said hearth body is tiltable for said contact with said furnace wall.

5. The hearth of claim 1, wherein said side wall is oriented at less than 90° to said floor.

6. A movable sweat hearth for use with a metal melting furnace having a wall provided with a metal-loading entrance, said sweat hearth comprising:

a hearth body movable relative to the furnace into and out of contact with said wall of said furnace at said entrance, the body having exterior walls enclosing a hollow interior except at a furnace-engagable side wall of the body provided, with an opening communicating with said interior, the interior having a floor adapted to support a charge of metal, and the opening being positioned relative to the floor to allow molten metal to drain from said interior through said opening; and said hearth body being configured to align said floor at an angle to horizontal to slope in a downward direction towards said opening when said container is moved into sealing engagement with said wall of the furnace with said opening aligned with said furnace entrance; and wherein said container body has at least one hinge permitting pivotable attachment to said furnace.

7. A movable sweat hearth for use with a metal melting furnace having a wall provided with a metal-loading entrance, said sweat hearth comprising:

a hearth body movable relative to the furnace into and out of contact with said wall of said furnace at said entrance, the body having exterior walls enclosing a hollow interior except at a furnace-engagable side wall of the body provided with an opening communicating with said interior, the interior having a floor adapted to support a charge of metal, and the opening being positioned relative to the floor to allow molten metal to drain from said interior through said opening; and said hearth body being configured to align said floor at an angle to horizontal to slope in a downward direction towards said opening when said container is moved into sealing engagement with said wall of the furnace with said opening aligned with said furnace entrance; and wherein said container body has ground-engaging supports that facilitate movement of the container body into and out of contact with the wall of the furnace.

8. The hearth of claim 7, wherein said ground-engaging supports comprise flanged wheels.

9. The hearth of claim 8, wherein said ground-engaging supports further comprise rails in contact with said flanged wheels, said rails being straight and oriented at right angles to said wall of the furnace.

10. The hearth of claim 8, wherein said ground-engaging supports further comprise rails in contact with said flanged wheels, said rails being arcuate to cause said container body to follow a curved path when moved into and out of contact with said furnace wall.

11. A movable sweat hearth for use with a metal melting furnace having a wall provided with a metal-loading entrance, said sweat hearth comprising:
a hearth body movable relative to the furnace into and out of contact with said wall of said furnace at said entrance, the body having exterior walls enclosing a hollow interior except at a furnace-engagable side wall of the body provided with an opening communicating with said interior, the interior having a floor adapted to support a charge of metal, and the opening being positioned relative to the floor to allow molten metal to drain from said interior through said opening; and
said hearth body being configured to align said floor at an angle to horizontal to slope in a downward direction towards said opening when said container is moved into sealing engagement with said wall of the furnace with said opening aligned with said furnace entrance; and
including a mechanism for tilting said hearth body for said sealing engagement.

12. The hearth of claim 1, wherein said container body is lined with an insulating refractory material except at said opening.

13. The hearth of claim 12, wherein said hearth body includes a metal shell surrounding said lining.

14. The hearth of claim 12, wherein said floor is formed by an upper surface of said lining of a horizontal bottom wall of the container body, said lining becoming progressively thicker with distance from said opening.

15. The hearth of claim 1, further comprising an outwardly projecting sill on the furnace-engageable wall having an upper surface that is flush with the floor of the hearth.

16. A movable sweat hearth for use with a metal-melting furnace, comprising:
a movable body having exterior walls lined with molten metal-resistant refractory material enclosing a hollow interior except at one side wall of the body provided with a single opening communicating with said interior requiring both loading of said metal into said interior and discharging of molten metal from said interior to said furnace through said single opening, the interior having a floor adapted to support a charge of metal, and the opening being positioned flush with the floor to allow molten metal to drain from the interior through said opening; and
said floor being arranged at an angle to horizontal to slope in a downward direction towards said opening,
wherein said movable body is configured to require said body to be moved away from the metal-loading entrance of the furnace for loading of said interior with a charge of metal through said opening.

17. The sweat hearth of claim 16, wherein the floor is an upper surface of said lining at a bottom wall of the body, and said angle to horizontal is caused by a progressive thickening of said lining in a direction away from said opening.

18. The sweat hearth of claim 16, wherein said angle is in a range of 5 to 45°.

19. The sweat hearth of claim 16, wherein said angle is in a range of 15 to 35°.

20. The sweat hearth of claim 16, wherein said body is rectangular.

21. A movable sweat hearth, comprising:
a movable body having exterior walls lined with molten metal-resistant refractory material enclosing a hollow interior except at one side wall of the body provided with an opening communicating with said interior, the interior having a floor adapted to support a charge of metal, and the opening being positioned flush with the floor to allow molten metal to drain from the interior through said opening; and
said floor being arranged at an angle to horizontal to slope in a downward direction towards said opening; and
wherein said body has wheels to facilitate movement thereof.

22. A combination of a metal melting furnace having a wall provided with a metal-loading entrance and a movable sweat hearth adapted for use with said furnace, said sweat hearth comprising:
a body movable relative to the furnace into and out of contact with said wall of said furnace at said entrance, the body having exterior walls enclosing a hollow interior except at a furnace-engagable side wall of the body provided with a single opening communicating with said interior requiring both loading of said metal into said interior and discharging of molten metal from said interior to said furnace through said single opening, the interior having a floor adapted to support a charge of metal, and the opening being positioned relative to the floor to allow molten metal to drain from said interior through said opening; and
the hearth body being configured to align the floor at an angle to horizontal to slope in a downward direction towards said opening when said container is moved into sealing engagement with said wall of the furnace with said opening aligned with the furnace entrance and to require said hearth body to be moved away from the metal-loading entrance of the furnace for loading of said interior of the hearth body with a charge of metal through said opening of the hearth body.

23. A combination of a metal melting furnace having a wall provided with a metal-loading entrance and a movable sweat hearth adapted for use with said furnace, said sweat hearth comprising:
a body movable relative to the furnace into and out of contact with said wall of said furnace at said entrance, the body having exterior walls enclosing a hollow interior except at a furnace-engagable side wall of the body provided with an opening communicating with said interior, the interior having a floor adapted to support a charge of metal, and the opening being positioned relative to the floor to allow molten metal to drain from said interior through said opening; and
the hearth body being configured to align the floor at an angle to horizontal to slope in a downward direction towards said opening when said container is moved into sealing engagement with said wall of the furnace with said opening aligned with the furnace entrance; and
wherein said hearth body is pivotally attached to the furnace to allow the sweat hearth to be swung into said sealing engagement with the furnace and alternatively away from the furnace.

24. A combination of a metal melting furnace having a wall provided with a metal-loading entrance and a movable sweat hearth adapted for use with said furnace, said sweat hearth comprising:

a body movable relative to the furnace into and out of contact with said wall of said furnace at said entrance, the body having exterior walls enclosing a hollow interior except at a furnace-engagable side wall of the body provided with an opening communicating with said interior, the interior having a floor adapted to support a charge of metal, and the opening being positioned relative to the floor to allow molten metal to drain from said interior through said opening; and the hearth body being configured to align the floor at an angle to horizontal to slope in a downward direction towards said opening when said container is moved into sealing engagement with said wall of the furnace with said opening aligned with the furnace entrance; and including releasable attachments for attaching the sweat hearth to the furnace when the hearth is in said sealing engagement.

25. The combination of claim 22, wherein said angle to horizontal is in a range of 5 to 45°.

26. The combination of claim 22, wherein said angle to horizontal is in a range of 15 to 35°.

* * * * *